J. A. NAYLOR.
Carriage-Body.
No. 29,902.
Patented Sept. 4, 1860.
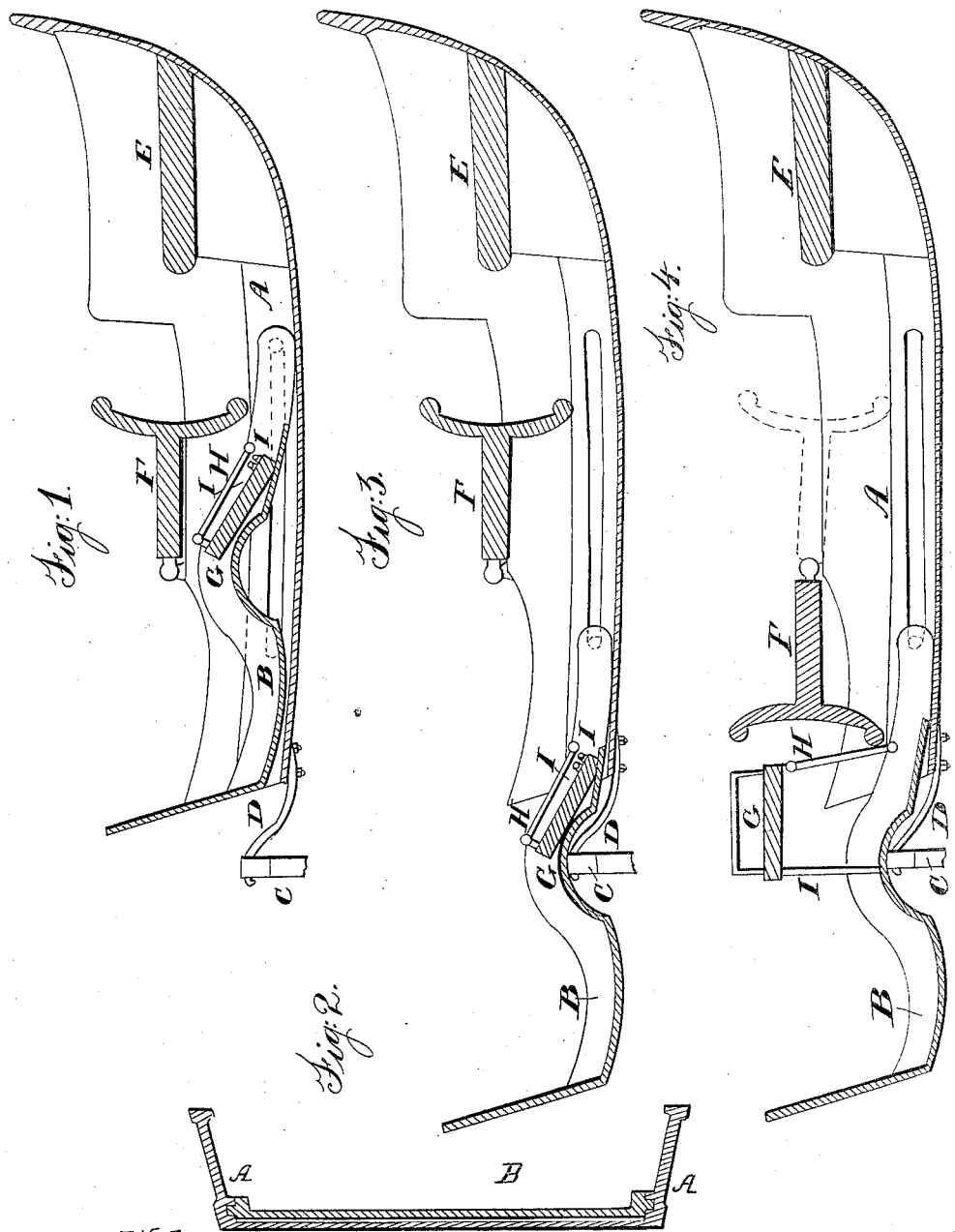

UNITED STATES PATENT OFFICE.

JOHN A. NAYLOR, OF RAHWAY, NEW JERSEY.

EXTENSION-CARRIAGE.

Specification of Letters Patent No. 29,902, dated September 4, 1860.

*To all whom it may concern:*

Be it known that I, JOHN A. NAYLOR, of Rahway, in the county of Union and State of New Jersey, have invented a new and useful Draw-Front Carriage; and I do hereby declare that the following is a full and exact description of the same, reference being had to the accompanying drawings, forming a part of this specification, in which—

Figure 1, is a longitudinal section of my carriage when in its contracted condition. Fig. 2, is a cross section of the same on the line S, S. Fig. 3, shows the same with the front drawn out but with the seats not adjusted to correspond therewith, and Fig. 4, shows the same with the front drawn out and the seats fully adjusted to correspond therewith.

Similar letters of reference indicate like parts in all the figures.

To enable others skilled in the art to make and use my invention I will proceed to describe its construction and operation by the aid of the drawings and of the letters of reference marked thereon.

A is the main body of the carriage.

B is a draw front fitted to slide out and in therein. B is fitted in grooves within A and is adapted to slide inward and outward to a certain limited extent. Fig. 1, shows the limit to which it may slide inward and, Figs. 3, and, 4 show the limit to which it may be extended.

C is the spring bar and D one of the body braces. When the part A is drawn out it rests upon C as shown by Figs. 3 and 4.

E is a stationary seat and F is a turnover seat mounted upon the body of the carriage in the manner in which such seats are usually supported.

G is a seat peculiarly mounted upon the draw front. It moves outward and inward therewith. When B is thrust in it lies in an inverted position upon the floor beneath F. When B is drawn out it moves out therewith and when B is out to its fullest extent G may be set up and made to serve as an independent seat as shown in Fig. 4. The means by which G is thus mounted are as follows:

H represents braces hinged upon one side of G and also hinged to B at that part thereof which when B is thrust in to its fullest extent lies under the rear edge of F and at a height above the floor of B about equal to the thickness of the seat G. The length of these braces H is about equal to the width of G. They may be provided with suitable branches or forks or with diagonal braces to insure lateral stiffness when in use.

I I are legs hinged upon G at the points represented so that they may when folded lie close against or be let into the side of G.

In using my improved carriage, if only two seats are required, the whole is placed in the position shown in Fig. 1, the draw front being slid in to its greatest extent, and the supplemental seat being folded under the seat F. But when another seat is required, the front is drawn out in the position shown in Figs. 3, and 4, and the supplemental seat expanded into proper form for use as shown in Fig. 4. The seat F may be turned over as shown in Fig. 4, or may remain in its former position at the option of the occupants, the seat G being at such a distance therefrom as to permit its use in either position.

I do not claim a draw front to a carriage as in itself new, nor do I claim that my seat G with its supports H and I is in itself new, but I am not aware that a seat has ever before been so arranged upon a draw front that it would be under a turnover or any other seat when the draw front is thrust in.

Having now fully described my invention what I claim as new therein and desire to secure by Letters Patent is—

The arrangement of the draw front B folding seat G and seat F substantially as herein described and for the purposes herein set forth.

In testimony whereof I have hereunto set my name in the presence of two subscribing witnesses.

JOHN A. NAYLOR.

Witnesses:
 THOMAS MARSH,
 JOHN A. CAMPBELL.